(12) United States Patent
Zamani et al.

(10) Patent No.: US 10,883,911 B2
(45) Date of Patent: Jan. 5, 2021

(54) METHOD AND ARRANGEMENT FOR DETERMINING AT LEAST ONE PORE-RELATED PARAMETER OF A POROUS STRUCTURE

(71) Applicant: Nanyang Technological University, Singapore (SG)

(72) Inventors: Farhad Zamani, Singapore (SG); Ebrahim Akhondi, Singapore (SG); Jia Wei Chew, Singapore (SG); William Bernard Krantz, Singapore (SG); Anthony Gordon Fane, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 198 days.

(21) Appl. No.: 16/074,854

(22) PCT Filed: Jan. 26, 2017

(86) PCT No.: PCT/SG2017/050037
§ 371 (c)(1),
(2) Date: Aug. 2, 2018

(87) PCT Pub. No.: WO2017/135892
PCT Pub. Date: Aug. 10, 2017

(65) Prior Publication Data
US 2019/0041313 A1 Feb. 7, 2019

(30) Foreign Application Priority Data
Feb. 4, 2016 (SG) .......................... 10201600868V

(51) Int. Cl.
*G01N 15/08* (2006.01)
*G01N 5/02* (2006.01)
*G01N 5/04* (2006.01)

(52) U.S. Cl.
CPC ........... *G01N 15/0893* (2013.01); *G01N 5/02* (2013.01); *G01N 5/04* (2013.01); *G01N 2015/086* (2013.01)

(58) Field of Classification Search
CPC ........ G01N 15/0893; G01N 5/02; G01N 5/04; G01N 2015/086; G01N 15/088; G01N 15/0886; G01N 2015/0833; G01N 15/08
(Continued)

(56) References Cited

U.S. PATENT DOCUMENTS

| | | | |
|---|---|---|---|
| 3,939,698 A | 2/1976 | De Lacy | |
| 5,002,399 A | 3/1991 | Akinc et al. | |

(Continued)

FOREIGN PATENT DOCUMENTS

| | | | |
|---|---|---|---|
| GB | 201105953 | * | 4/2011 |
| SU | 1495688 | * | 7/1989 |

(Continued)

OTHER PUBLICATIONS

International Search Report and Written Opinion for Application No. PCT/SG2017/050037 dated Mar. 27, 2017, 11 pages.
(Continued)

*Primary Examiner* — Robert R Raevis
(74) *Attorney, Agent, or Firm* — Alston & Bird LLP

(57) ABSTRACT

In various embodiments, a method for determining at least one pore-related parameter of a porous structure is provided. The method includes supplying a volatile liquid into a chamber. The method also includes coating a first surface of the porous structure with an evaporation preventing substance. The method further includes placing the coated porous structure within the chamber. The method additionally includes determining an effective mass of the chamber over a period of time. The method also includes determining the at least one pore-related parameter of an uncoated
(Continued)

second surface of the coated porous structure based on the effective mass determined. The second surface of the porous structure is opposite the first surface of the porous structure.

21 Claims, 12 Drawing Sheets

(58) Field of Classification Search
USPC .............. 73/865, 38, 866, 865.9, 37.5, 37.9
See application file for complete search history.

(56) References Cited

U.S. PATENT DOCUMENTS

| 2005/0034507 | A1 | 2/2005 | Volfkovich et al. | |
|---|---|---|---|---|
| 2013/0042670 | A1 | 2/2013 | Greenberg et al. | |
| 2014/0291040 | A1* | 10/2014 | Schrag ................ | G01G 3/1414 177/1 |

FOREIGN PATENT DOCUMENTS

| WO | 2011/137454 | * | 3/2011 |
|---|---|---|---|
| WO | WO 2011/137454 A1 | | 11/2011 |
| WO | WO 2015/053709 A1 | | 4/2015 |

OTHER PUBLICATIONS

Akhondi, E. et al., *Improved Design and Protocol for Evapoporometry Determination of the Pore-Size Distribution*, Journal of Membrane Science, 496 (2015) 334-343.

Hofs, B. et al., *Comparison of Ceramic and Polymeric Membrane Permeability And Fouling Using Surface Water*, Separation and Purification Technology, 79 (2011) 365-374.

*Pore Size Analysis of Hollow Fiber Membranes by Porometry*, Quantachrome Instruments (Jun. 28, 2013) 9 pages.

Zamani, F. et al., *Evapoporometry Adaptation to Determine the Human-Side Pore-Size Distribution (PDS) of Hollow Fiber and Tubular Membranes*, Journal of Membrane Science, vol. 526 (2017), 1-8.

* cited by examiner

- supply a volatile liquid into a chamber — 102
- coat a first surface of the porous structure with an evaporation preventing substance — 104
- place the coated porous structure within the chamber — 106
- determine an effective mass of the chamber over a period of time — 108
- determine the at least one pore-related parameter of an uncoated second surface of the coated porous structure based on the effective mass determined — 110

METHOD AND ARRANGEMENT FOR DETERMINING AT LEAST ONE PORE-RELATED PARAMETER OF A POROUS STRUCTURE

CROSS-REFERENCE TO RELATED APPLICATIONS

This application is a national phase entry of PCT/SG2017/050037, filed on 26 Jan. 2017, which claims the benefit of priority of Singapore application No. 10201600868V, filed 4 Feb. 2016, the contents of it being hereby incorporated by reference in its entirety for all purposes.

TECHNICAL FIELD

Various embodiments relate to a method for determining at least one pore-related parameter of a porous structure. Various embodiments relate to an arrangement for determining at least one pore-related parameter of a porous structure.

BACKGROUND

Hollow fiber (HF) membranes that have a higher packing density than conventional flat sheet membranes and which readily permit backwashing are widely used in many applications. The pore sizes of microfiltration (MF) HF membranes range from 50 nm to 1000 nm and those for ultrafiltration (UF) HF membranes range from 2 nm to 100 nm Since the pore-size distribution (PSD) of membranes can greatly affect membrane performance, the PSD of MF and HF membranes needs to be accurately characterized.

The PSD of MF and UF membranes can be determined via direct observation methods such as scanning electron microscopy (SEM) and atomic force microscopy (AFM). SEM requires a high vacuum and therefore drying the sample, which can alter the pore structure. In order to minimize charging and damage due to the electron beam, non-conducting samples have to be conductively coated; this can decorate the membrane pores and alter the PSD. Field-emission SEM (FESEM) can reduce the charging and electron beam damage by being able to use a lower voltage. Environmental SEM (ESEM), developed for wet or non-conducting materials, avoids having to coat or dry the samples. However, lower resolution limits its use for characterizing MF and UF membranes. AFM scans the sample surface with a fine tip on a cantilever whose deflections are used to generate a three-dimensional (3D) map of the surface topography. AFM does not require special sample preparation and can be done in a gas or liquid. It can determine the pore size, surface porosity, and PSD of a membrane. However, direct characterization methods image a small area (typically <1 mm$^2$) that might not be representative of the membrane on the macroscale. Furthermore, direct observation methods that include scanning electron microscopy (SEM), field-emission scanning electron microscopy (FESEM), environmental scanning electron microscopy (ESEM), and atomic force microscopy (AFM) require very expensive instruments that are limited in that they can measure the pore size only within a small area of a few hundred microns. Moreover, they are of limited use for obtaining the PSD of irregular pores such as encountered in solvent-cast polymeric membranes.

Indirect methods to determine the PSD based on the Young-Laplace equation relating the pressure to the pore diameter include liquid displacement porometry (LDP) and mercury porosimetry. LDP involves progressively displacing a non-volatile wetting liquid from the largest to the smallest pores by a gas or immiscible liquid under pressure. The pore volume of a given diameter is determined from the displacing fluid flow rate at each pressure. The high pressure required by LDP for the smaller pores in UF membranes (typically >30 bar) can cause compaction that alters the PSD and limits it to characterizing pores larger than approximately 10 nm. Mercury porosimetry involves progressively filling the pores with mercury and uses a data-analysis procedure similar to LDP. The PSD determined by mercury porosimetry includes dead-end and continuous pores in contrast to LDP that measures only continuous pores. Owing to the high surface tension of mercury, this technique requires very high pressures.

Indirect methods based on the Kelvin equation relating the vapour pressure to the pore diameter include gas adsorption/desorption (GAD) and permporometry. Both methods involve filling the pores via adsorption and capillary condensation and then reducing the partial pressure to cause progressive desorption from the largest to the smallest pores; the pore volume for each diameter is determined from the amount of gas desorbed. Whereas the PSD determined by GAD includes both continuous pores that extend through the membrane and dead-end pores, permporometry determines only the continuous pores by imposing the simultaneous flow of a non-condensable gas during pore draining. A concentration or temperature gradient can be the driving force for the non-condensable gas flow. Using permporometry is challenging especially for HF membranes because it is necessary to control and measure the non-condensable carrier gas and condensable gas flow rates and the partial pressures across the membrane as well as the temperature. The PSD determined by GAD and permporometry has to be corrected for the t-layer (typically <4 nm). A t-layer forms owing to equilibrium adsorption of gas on the pore walls. The resulting thin adsorbed layer has a maximum thickness on the order of a few nanometers that depends on the particular gas and its partial pressure.

Techniques such as displacement porometry (LDP) and gas adsorption/desorption require relatively expensive dedicated equipment. LDP involves the application of high pressures that can deform the material and thereby its pore-size distribution. Moreover, displacement porometry can characterize only relatively large pores typically greater than 10 nm. Gas adsorption/desorption can accurately characterize only relatively small pores typically less than 10 nm.

Indirect methods based on the Gibbs-Thompson equation relating the freezing-point temperature to the pore diameter include thermoporometry. This involves gradually increasing the temperature of a frozen liquid-saturated membrane that causes melting progressively from the smallest to the largest pores. The pore diameter and the associated pore volume are obtained from the heat released during solidification or the heat input during melting. A correction is necessary for the smallest pores due to a submicron layer of unfrozen liquid at the pore walls (similar to the t-layer in GAD and permporometry).

SUMMARY

In various embodiments, a method for determining at least one pore-related parameter of a porous structure may be provided. The method may include supplying a volatile liquid into a chamber. The method may also include coating a first surface of the porous structure with an evaporation preventing substance. The method may further include placing the coated porous structure within the chamber. The method may additionally include determining an effective mass of the chamber over a period of time. The method may also include determining the at least one pore-related parameter of an uncoated second surface of the coated porous structure based on the effective mass determined. The second surface of the porous structure may be opposite the first surface of the porous structure.

In various embodiments, an arrangement for determining at least one pore-related parameter of a porous structure may be provided. The arrangement may include a chamber. The chamber may include a volatile liquid, and a porous structure including a first surface and a second surface opposite the first surface. The porous structure may include an evaporation preventing substance on the first surface of the porous structure. The second surface of the porous structure may be uncoated. The arrangement may additionally include a mass determination device configured to determine an effective mass of the chamber over a period of time so that the at least one pore-related parameter of the second surface of the porous structure may be determined based on the effective mass determined.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1 is a schematic showing a method for determining at least one pore-related parameter of a porous structure according to various embodiments.

DETAILED DESCRIPTION

Figure 2:
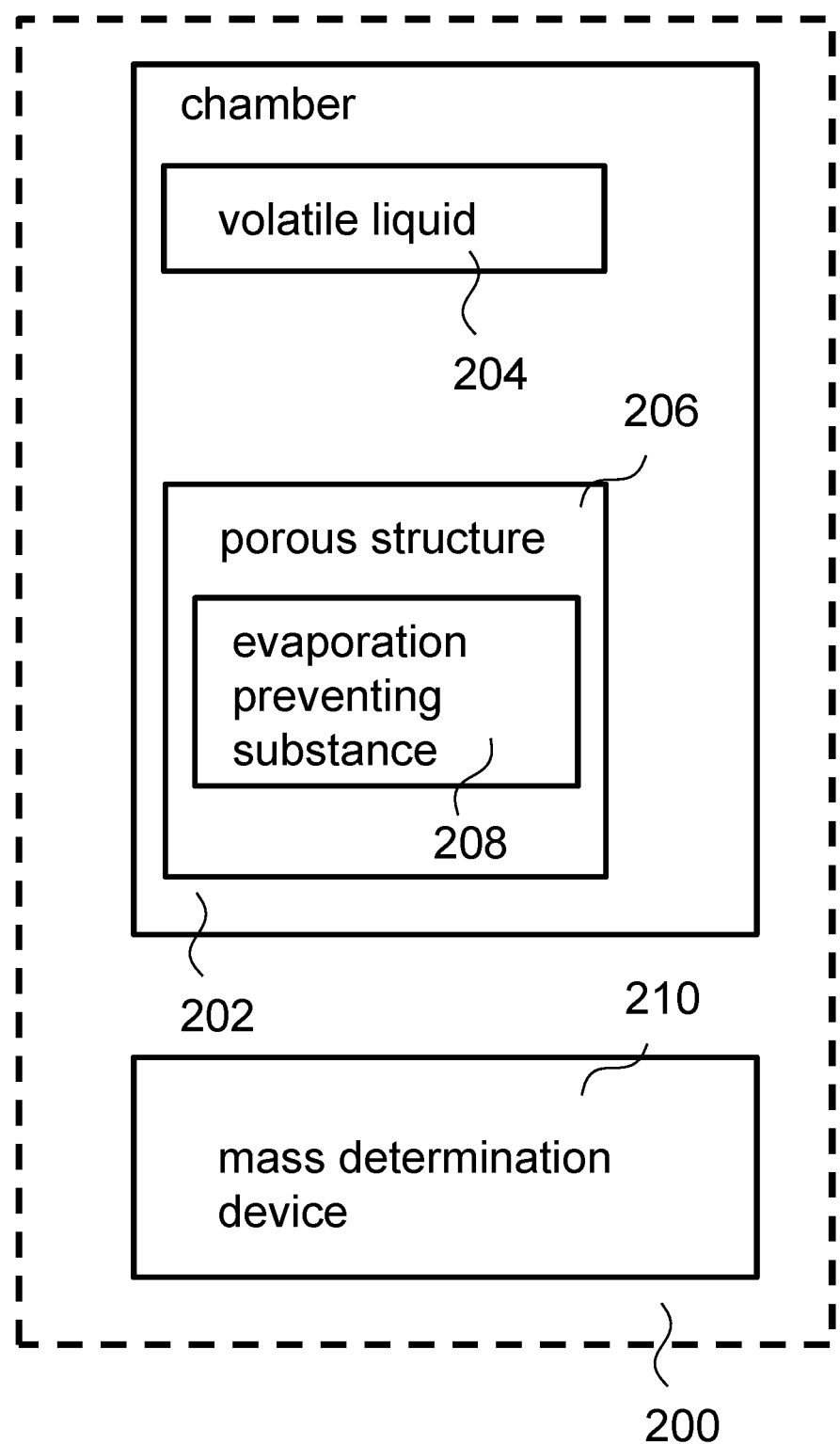
FIG. 2 is a general schematic illustrating an arrangement for determining at least one pore-related parameter of a porous structure according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Evapoporometry (EP) may be used to determine the pore size, porosity, and/or other pore-related parameters of a membrane based on the evaporative mass loss from the membrane. The membrane may have been pre-saturated with a wetting volatile liquid, which may reduce vapour pressure due to the surface curvature at the air-liquid interface within the pores of the membrane. EP may involve placing the membrane that has been saturated with a volatile liquid in a chamber or test cell, which may be placed on a mass determination device such as a microbalance. The liquid may evaporate progressively from the largest pores to the smallest pores since the vapour pressure decreases with decreasing pore diameter for a wetting liquid. No evaporation may occur from the smaller pore when evaporation is occurring from the larger pores as the ambient gas phase adjacent the volatile liquid in the smaller pore may be supersaturated. At any instant of time, liquid may be evaporating from only one pore size since the test cell may be configured to ensure that the ambient gas phase environment above any smaller pores is supersaturated, whereas the larger pores are already been emptied of liquid. The evaporation rate, which is the slope of the total test cell mass versus time plot, may be related to the vapour pressure of the wetting liquid at the interface between the liquid in the pores and the ambient gas phase, which in turn may be related to the pore diameter.

The Kelvin equation is used to obtain the pore diameter, d, from the instantaneous vapour pressure for a wetting liquid:

$$\ln\frac{\bar{p}_A}{p_A^\circ} = -\frac{4V\sigma\cos\theta}{dRT} \qquad (1)$$

where $p_A^\circ$ is the vapour pressure of the volatile liquid (which may be referred to as wetting liquid/solvent) over a flat interface, $\bar{p}_A$ is the partial pressure of the volatile liquid in the pores that are draining, $\sigma$ is the interfacial tension, V is the liquid molar volume, $\theta$ is the contact angle of the volatile liquid on the material constituting the walls of the pores, R is the gas constant, and T is the absolute temperature.

For a completely wetting liquid for which $\theta=0$, Equation (1) assumes the form $$d = -\frac{4\sigma V}{RT\ln\frac{\bar{p}_A}{p_A^\circ}} \qquad (2)$$

Equation (2) may be expressed as $$d = -\frac{4\sigma V}{RT\ln\frac{x_{A0}}{x_{A0}^\circ}} \qquad (3)$$

where $x_{A0}$ is the mole fraction of the volatile liquid at the surface of the membrane owning to evaporation (or during pore draining and) $x_{A0}^\circ$ is the mole fraction at the flat interface or surface of a planar layer of the volatile liquid (or the mole fraction at the surface of an evaporating free-standing layer of volatile liquid). The planar layer of volatile liquid may mean that the volatile liquid is not on a porous structure such as a hollow fiber or a tubular membrane.

FIG. 1 is a schematic showing a method 100 for determining at least one pore-related parameter of a porous structure according to various embodiments. The method may include, in 102, supplying a volatile liquid into a chamber. The method may also include, in 104, coating a first surface of the porous structure with an evaporation preventing substance. The method may further include, in 106, placing the coated porous structure within the chamber. The method may additionally include, in 108, determining an effective mass of the chamber over a period of time. The method may also include, in 110, determining the at least one pore-related parameter of an uncoated second surface of the porous structure based on the effective mass determined. The second surface of the porous structure may be opposite the first surface of the porous structure.

In other words, the method may include coating only one surface of a porous structure with an evaporation preventing substance while leaving an opposing surface of the porous structure uncoated. The coated porous structure (i.e. the porous structure with only the first surface coated) may be arranged in a chamber which also includes a volatile liquid. The change in the effective mass of the chamber (including the volatile liquid and the coated structure) may be determined. The at least one pore-related parameter of a second surface of the porous structure may be determined based on the change in the effective mass of the chamber.

The pore-related parameter may include the porosity, pore size, pore-size distribution, and/or internal pore fouling of the porous structure.

In various embodiments, the porous structure may be a tubular porous structure (i.e. tubular shaped material) such as a hollow fiber or a tubular membrane. A tubular porous structure may be in the shape of a tube with a hollow or lumen. The first surface may be an outer surface of the tubular porous structure, and the second surface may be an inner surface of the tubular porous structure. In various embodiments, the outer surface of the tubular porous structure may be coated with the evaporation preventing substance, while the inner surface may not be coated with the evaporation preventing substance. It may also be envisioned that the porous structure may instead be a substantially flat porous structure, such as a flat porous membrane.

Various embodiments may provide an approach or technique for determining the porosity, the pore-size distribution (PSD) and/or other pore-related parameters of the inner surface of a tubular porous structure.

Various embodiments may provide a technique for characterization of porous structures such as hollow fibers and tubular membranes, and internal fouling, for example relating to at least one pore-related parameter of the porous structures.

Various embodiments may enable determination of the porosity, pore-size distribution, and internal pore fouling of porous structures such as hollow fibers and tubular membranes by evaporative mass loss.

Various embodiments may be a method based on evaporometry (EP).

The evaporation preventing substance may be any suitable substance that is configured to prevent or at least reduce evaporation of the volatile liquid from a surface, i.e. the first surface, of the porous structure. The evaporation preventing substance may at least substantially reduce the evaporation of the volatile liquid from the surface. The evaporation preventing substance may be an adhesive such as glue, or a potting material. A "potting material" may refer to a solid or gelatinous compound used for resistance to shock and vibration, and/or for exclusion of moisture and corrosive agents. Potting materials may for instance include silicone, epoxy, thermosetting plastics and/or silicone rubbers. As the evaporation preventing substance is coated on the first surface of the porous structure, no evaporation or insubstantial evaporation of the volatile liquid occurs on the first surface. The change in effective mass of the chamber may be thus attributed to evaporation of volatile liquid from the uncoated second surface of the porous structure. The pore-related parameter determined according to various embodiments may thus relate to the second surface.

The volatile liquid may be any suitable liquid. The volatile liquid may be a wetting volatile liquid, or a non-wetting volatile liquid. The volatile liquid may produce vapour that is less dense than air, e.g. water. The volatile liquid may produce vapour that is denser than air, e.g. isopropyl alcohol (IPA).

In the current context, "coating the first surface of the porous structure" may include applying, using any suitable method, the evaporation preventing substance on the first surface of the porous structure so that the evaporation preventing substance is in contact with the first surface of the porous structure. Accordingly, "coated porous structure"

may refer to a porous structure having a first surface applied with the evaporation preventing substance. "Uncoated second surface" may refer to the second surface of the porous structure not applied with the evaporation preventing substance. The second surface of the porous structure may not be in contact with the evaporation preventing substance. By applying the evaporation preventing substance on the first surface and not on the second surface, the pores on the first surface may become blocked, while the pores on the second surface may remain unblocked. Volatile liquid within the pores on the second surface may evaporate during characterization, while evaporation of volatile liquid within pores on the first surface may be prevented or may be reduced substantially. Accordingly, characterization or determination of the at least one pore-related parameter of only the pores on the second surface may be carried out. In various embodiments, coating the first surface of the porous structure may include or refer to embedding the porous structure in the evaporation preventing substance so that a substrate, which includes the evaporation preventing substance and the porous structure embedded in the evaporation preventing substance, is formed. In other words, the porous structure may be inserted into or contacted with the evaporation preventing substance. When a tubular porous structure is embedded into the evaporation preventing substance, the inner surface of the tubular porous structure may remain or may be free of the evaporation preventing substance, while the outer surface of the tubular porous structure may be in contact with the evaporation preventing substance.

The porous structure may extend from a first surface of the substrate to a second surface of the substrate opposite the first surface of the substrate. The porous structure may be a tubular porous structure extending from the first surface of the substrate to the second surface of the substrate opposite the first surface of the substrate.

In various embodiments, coating the first surface of the porous structure may include or refer to coating an entire first surface of the porous structure. The first surface of the porous structure may be entirely covered by the evaporation preventing substance.

The method may also include coating the first surfaces of one or more further porous structures. The porous structure and the one or more further porous structures may form a plurality of porous structures. The method may include embedding the plurality of porous structures into the evaporation preventing substance. The substrate may include a plurality of porous structures, e.g. tubular porous structures.

The plurality of porous structures may extend from a first surface of the substrate to a second surface of the substrate opposite the first surface of the substrate. The plurality of porous structures may be arranged to be parallel to one another.

The substrate may be held by a tubular holder such as a plastic tube or ring. The substrate with the embedded porous structure(s) may be surrounded by the tubular holder.

In various embodiments, the method may include curing the evaporation preventing substance. The evaporation preventing substance may be cured by heat. The tubular holder may be removed after curing the evaporation preventing substance. The evaporation preventing substance may solidify after curing.

In various embodiments, the method may also include determining an evaporation rate from the effective mass determined. The method may further include relating the evaporation rate to a vapour pressure ($\bar{p}_A$) of the volatile liquid at an interface between the volatile liquid in the porous structure and an ambient gas phase within the chamber. Determining the at least one pore-related parameter of the porous structure(s) may include determining the at least one pore-related parameter based on the vapour pressure determined, which may be as illustrated in Equation (2).

In various embodiments, the method may include determining an evaporation rate from the effective mass determined. The method may additionally include relating the evaporation rate to a mole fraction ($x_{AO}$) of the volatile liquid at an interface between the volatile liquid in the porous structure and an ambient gas phase within the chamber. Determining the at least one pore-related parameter of the porous structure(s) may include determining the at least one pore-related parameter based on the mole fraction determined, which may be as illustrated in Equation (3).

The method may also include determining an evaporation rate of a layer of volatile liquid over a flat interface. The method may also include relating the evaporation rate of the layer of volatile liquid over the flat interface to a vapour pressure ($p°_A$) of the volatile liquid over the flat interface. The method may alternatively or additionally include relating the evaporation rate of the layer of volatile liquid over the flat interface to a mole fraction ($x°_{AO}$) of the volatile liquid over the flat interface.

EP may permit characterizing pore sizes from a few nanometers up to near micron-scale by measuring or determining the mass loss as a function of time from the porous structures.

In various embodiments, determining an effective mass of the chamber may include determining the effective mass of the chamber at a series of time intervals to generate a plurality of instantaneous masses. The at least one pore-related parameter may be a pore-size distribution. Determining the at least one pore-related parameter of the second surface of the porous structure may include associating a respective instantaneous mass of the generated plurality of instantaneous masses to a respective pore diameter of the porous structure(s), and determining the pore-size distribution based on the plurality of instantaneous masses generated and the associated pore diameters.

In various embodiments, the method may also include saturating the porous structure(s) with the volatile liquid prior to placing the porous structure(s) in the chamber. In other words, the porous structure(s) may be presaturated with the volatile liquid. The volatile liquid may, in addition to being supplied to the chamber, be also used to saturate the porous structure(s). For instance, the porous structure(s) may be immersed in the volatile liquid for a predetermined duration. In various other embodiments, the method may also include saturating the porous structure(s) within the chamber with the volatile liquid. This may mean that the porous structure(s) may be saturated when the porous structure(s) is in the chamber.

The volatile liquid may be supplied to a base portion of the chamber so that the chamber includes a layer of volatile liquid. The coated porous structure(s) may be placed within the chamber such that the porous structure is or the porous structures are over the layer of volatile liquid. In other words, the porous structure(s) may be spaced apart or separated from the volatile liquid at the base of the chamber. The porous structure may be arranged or placed over the volatile liquid. The volatile liquid within the chamber, e.g. at the base portion, may evaporate and the resulting vapour may diffuse to the porous structure(s). During operation, the volatile liquid at the base portion may evaporate first. After the volatile liquid at the base portion has been evaporated, the volatile liquid at the larger pores may evaporate, followed by the volatile liquid at the smaller pores. As highlighted previously, the volatile liquid may evaporate progressively from the largest pores to the smallest pores since the vapour pressure decreases with decreasing pore diameter for a wetting liquid. No evaporation may occur from the smaller pore when evaporation is occurring from the larger pores as the ambient gas phase adjacent the volatile liquid in the smaller pore may be supersaturated. At any instant of time, liquid may be evaporating from only one pore size since the test cell may be configured to ensure that the ambient gas phase environment above any smaller pores is supersaturated, whereas the larger pores are already been emptied of liquid. The separation of the volatile liquid at the base and the porous structure(s) may avoid the formation of a meniscus between the volatile liquid at the base and the porous structure(s).

In various embodiments, the disc including the substrate of evaporation preventing material may hold the embedded porous structure(s) above the volatile liquid at the base so that the volatile liquid at the base is not in direct contact with the embedded porous structure(s). The disc may be positioned vertically within the chamber on an edge of the disc, or may be positioned so that the disc is at least supported by a side of the chamber. It may also be envisioned that a stand is positioned in the chamber, and the disc is placed on the stand so that the disc including the embedded porous structure(s) does not come into contact with the volatile liquid at the base of the chamber.

In various embodiments, the method may include controlling evaporation of the volatile liquid in the chamber.

In various embodiments, controlling evaporation of the volatile liquid in the chamber may include arranging a diffusional resistance element spaced over the coated porous structure. The diffusional resistance element may be configured to resist diffusion of vapour of the volatile liquid. The diffusional resistance element may include a lid. The lid may include an opening or hole inlet extending from a first surface of the lid to a second surface of the lid opposite the first surface of the lid.

In various embodiments, the porous structure(s) may be fouled. In other words, the porous structure(s) may have been exposed to a foulant before characterization.

Various embodiments may also relate to the design and application of an arrangement including a suitable test cell for characterization of porous structures such as hollow fibers and tubular membranes.

FIG. 2 is a general schematic illustrating an arrangement 200 for determining at least one pore-related parameter of a porous structure according to various embodiments. The arrangement 200 may include a chamber 202. The chamber 202 may include a volatile liquid 204, and a porous structure 206 including a first surface and a second surface opposite the first surface. The porous structure may include an evaporation preventing substance 208 on the first surface of the porous structure 206. The second surface of the porous structure 206 may be uncoated. The arrangement 200 may additionally include a mass determination device 210 configured to determine an effective mass of the chamber 202 over a period of time so that the at least one pore-related parameter of the second surface of the porous structure 206 may be determined based on the effective mass determined.

In other words, the arrangement 200 may include a chamber 202 including a volatile liquid 204 and a porous structure 206 with a surface coated with an evaporation preventing substance 208 and an uncoated opposing surface. The pores on the coated surface may be covered by the evaporation preventing substance 208, while the pores on the uncoated surface may be exposed. A mass determination device 210 may be used to determine the change in mass of the chamber 202 over time. One or more pore-related parameters pertaining to pores on the second surface may be computed based on the change in mass of the chamber 202 over time.

In various embodiments, the porous structure 206 may be a tubular porous structure, such as a hollow fiber membrane or a tubular membrane. The porous structure 206 may be tubular shape with a hollow or lumen extending from a first end of the tube to a second end of the tube. The first surface may be an outer surface of the tubular porous structure. The second surface may be an inner surface of the tubular porous structure. The second surface or inner surface may define the hollow interior or lumen of the tubular porous structure.

In various other embodiments, the porous structure 206 may be planar in shape, such as a porous membrane.

In various embodiments, the chamber 202 may include a disc including a substrate. The substrate may include the evaporation preventing substance 208, and the tubular porous structure 206 embedded in the evaporation preventing substance 208. The outer surface of the tubular porous structure 206 may be in contact with the evaporation preventing substance 208 and the inner surface of the tubular porous structure 206 may be uncoated. In other words, the inner surface of the tubular porous structure 206 may be devoid of the evaporation preventing substance 208.

The tubular porous structure 206 may extend from a first surface of the substrate to a second surface of the substrate opposite the first surface of the substrate.

In various embodiments, the substrate may also include one or more further tubular porous structures. The tubular porous structure 206 and the one or more further tubular porous structures may form a plurality of tubular porous structures. The plurality of tubular porous structures may be arranged in parallel to one another. The plurality of tubular porous structures may extend from the first surface of the substrate to the second surface of the substrate. Each of the one or more further porous structures may have an outer surface coated with the evaporation preventing substance 208, and an uncoated inner surface.

In various embodiments, the disc may further include a tubular holder holding the substrate. The tubular holder may be a plastic tube.

In various embodiments, the tubular porous structure 206 or the plurality of tubular porous structures may be saturated with the volatile liquid. The tubular porous structure 206 or the plurality of tubular porous structures may be presaturated with the volatile liquid before the tubular porous structure 206 or the plurality of tubular porous structures is placed within the chamber 202.

In various embodiments, the chamber 202 may include an upper portion and a base portion. The upper portion may be removeably coupled to the base portion by securing means, such as by means of nuts and bolts. The base portion may include a recess or reservoir to receive the volatile liquid 204.

The chamber 202 may include a low energy material such as Teflon adapted to reduce or avoid wetting or adsorption of the volatile liquid 204.

The mass determination device 210, such as a microbalance, may be configured to determine an effective mass of the chamber 202 or a change in effective mass of the chamber 202. The chamber 202 may be positioned on the mass determination device 210. The mass determination device 210 may be capable of measuring mass on the microgram level.

"Effective mass" as described herein may refer to the mass of the chamber 202 and its contents, for instance, including the volatile liquid 204 supplied, the porous structure 206, and the evaporation preventing substance 208. The effective mass may further include for instance the further porous structures, the volatile liquid used to presaturate the porous structure(s), and/or the tubular holder etc.

In various embodiments, the chamber 202 may include a diffusion resistance element. The diffusion resistance element may be a lid with an inlet hole.

In various embodiments, the arrangement 200 may further include an absorbent material, such as silica gel or granular activated carbon (GAC), configured to control a vapour concentration of the volatile liquid.

In various embodiments, the arrangement 200 may also include an incubator or environmental chamber configured to maintain a temperature of the chamber 202.

In various embodiments, the arrangement 200 may additionally include an anti-vibration platform configured to support the mass determination device 210. The chamber 202 may be placed or arranged on the mass determination device 210. The mass determination device 210 may be arranged on the vibration platform.

The arrangement 200 may also include a computer system coupled to the mass determination device 210. The computer system is configured to record the effective mass determined (by the mass determination device 200) over time.

Figure 3A:
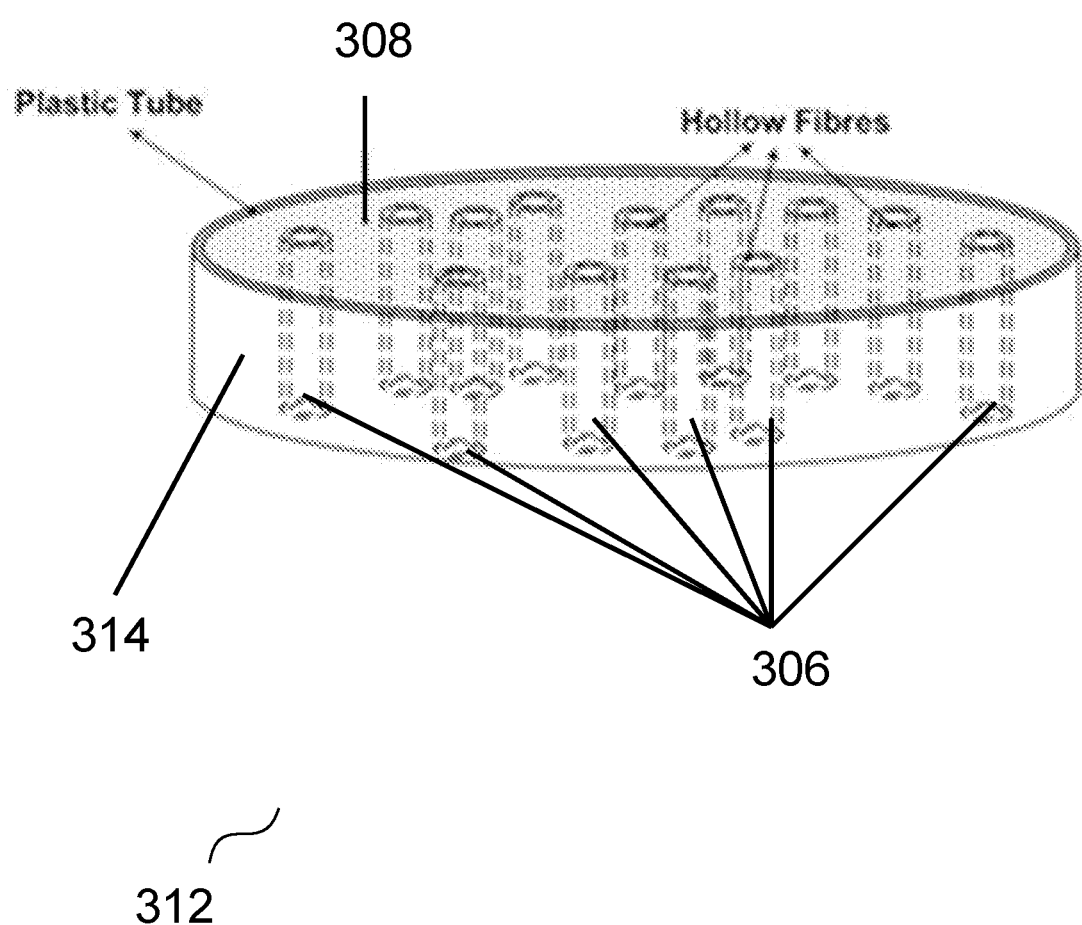
FIG. 3A is a schematic showing perspective view of a disc containing a plurality of the tubular porous structures according to various embodiments.
Figure 3B:
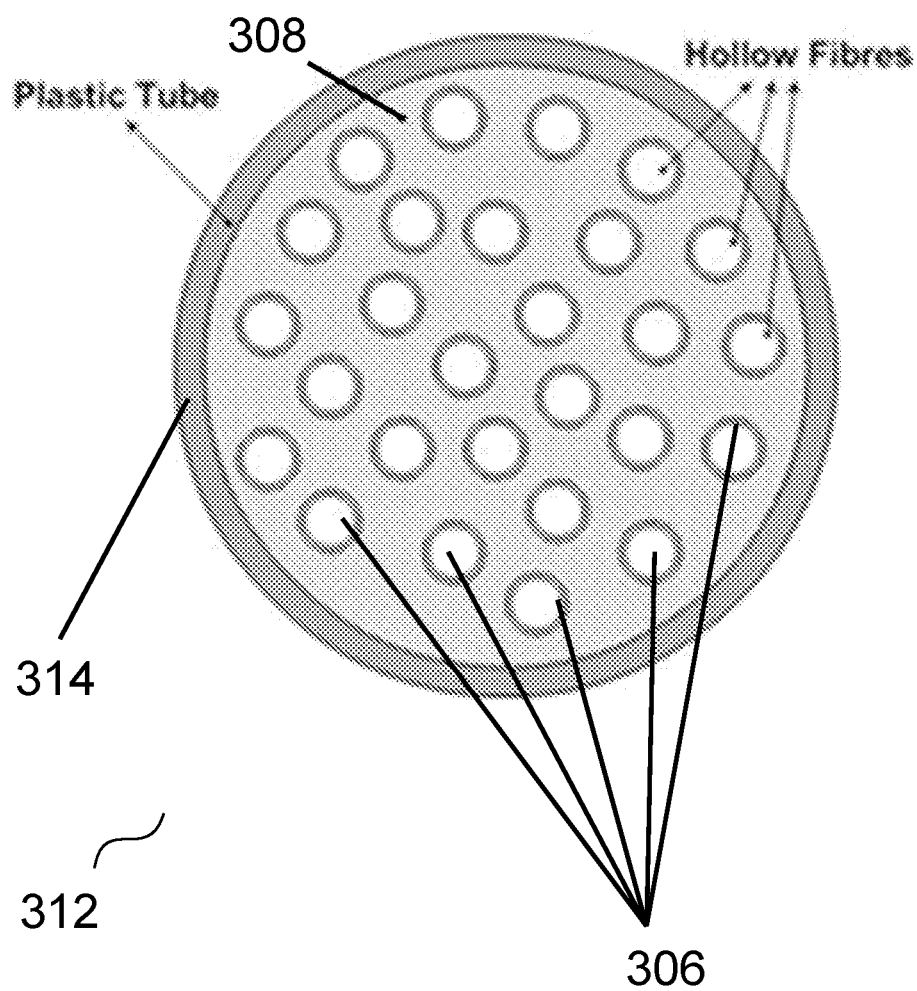
FIG. 3B is a schematic showing a top planar view of the disc containing the plurality of the tubular porous structures according to various embodiments.
Figure 3C:
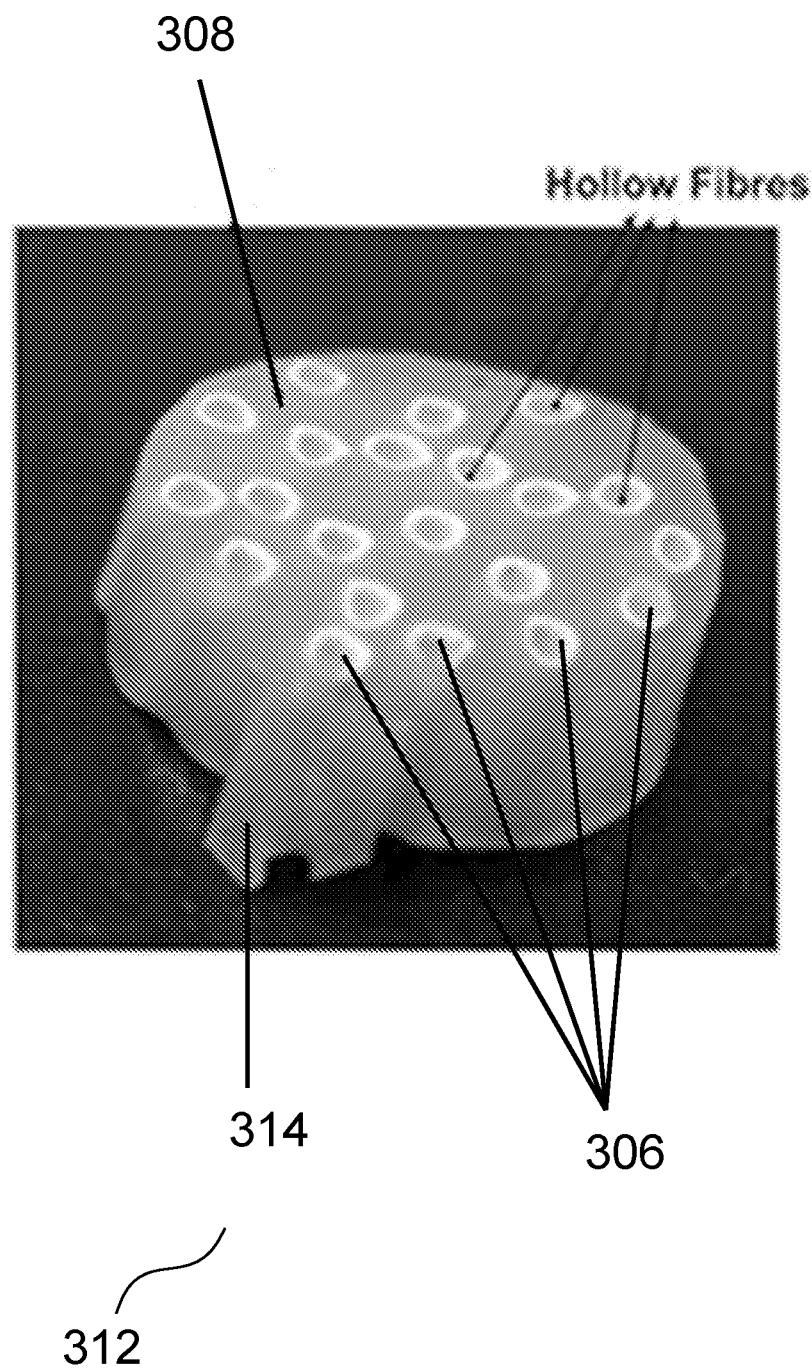
FIG. 3C is a photo image of the disc according to various embodiments illustrated in FIGS. 3A and 3B.

FIG. 3A is a schematic showing perspective view of a disc 312 containing a plurality of the tubular porous structures 306 according to various embodiments. FIG. 3B is a schematic showing a top planar view of the disc 312 containing the plurality of the tubular porous structures 306 according to various embodiments. FIG. 3C is a photo image of the disc 312 according to various embodiments illustrated in FIGS. 3A and 3B. The disc 312 may include a substrate which includes an evaporation preventing substance 308, i.e. glue, and a plurality of tubular porous structures 306, i.e. hollow fibers, embedded in the evaporation preventing substance 308. The disc 312 may further include a plastic tube 314 which surrounds the glue 308. For the sake of clarity, not all the hollow fibers 306 in FIGS. 3A-C have been labelled. It may be seen in FIG. 3A that the hollow fibers 306 are arranged in parallel to one another and may extend from a first surface of the substrate to a second surface of the substrate opposite the first surface of the substrate. It may also be envisioned that the tubular porous structures 306 may instead be tubular membranes. In various embodiments, there may be approximately 20 porous structures 306, and each porous structure 306 may be about 2 mm long. The porous structures 306 may be saturated with volatile liquid, even before the disc 312 is positioned within the chamber. The volatile liquid may be a volatile wetting non-interacting liquid.

Figure 3D:
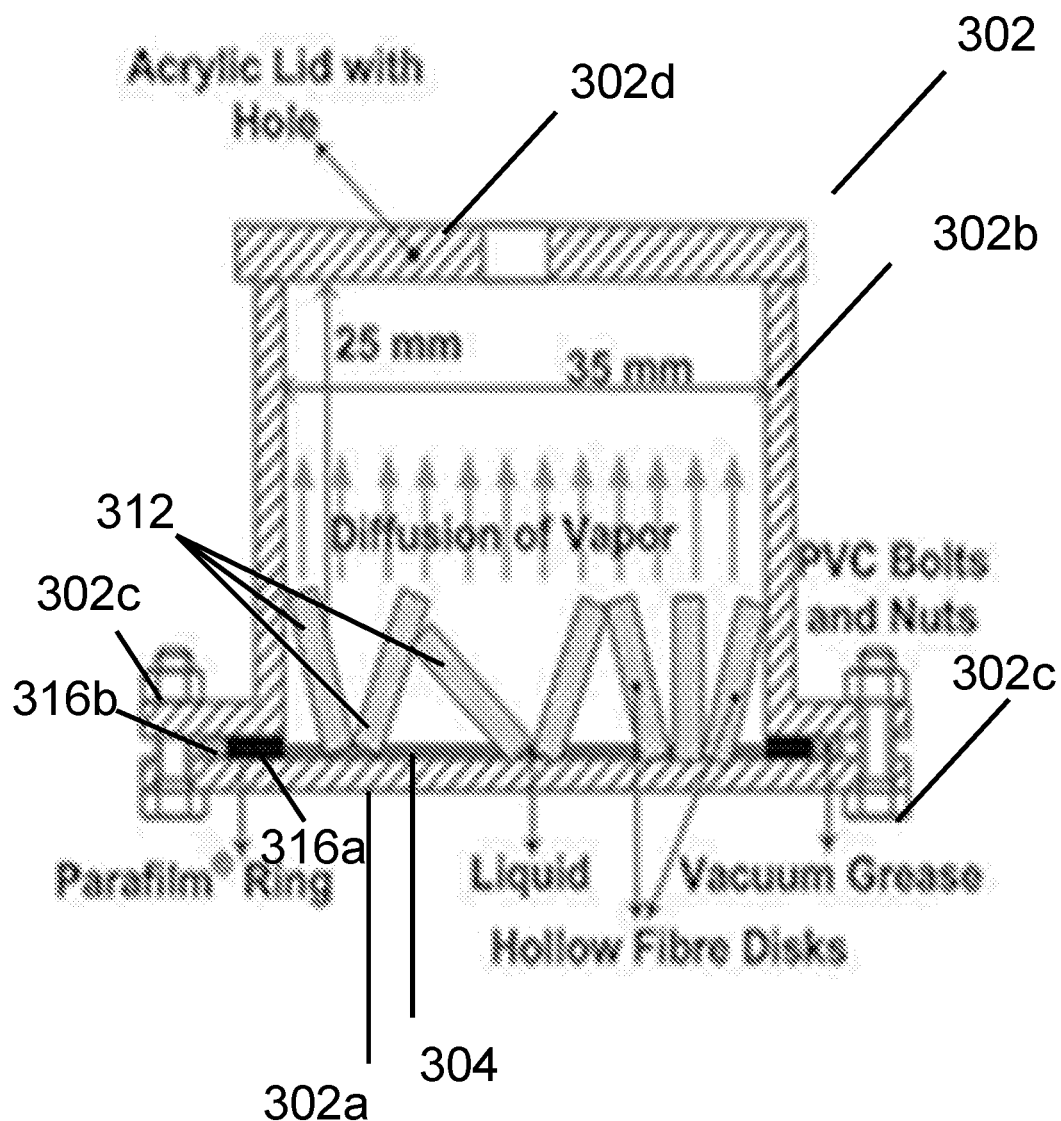
FIG. 3D is a schematic showing a cross-sectional side view of a test cell or chamber containing a plurality of discs according to various embodiments.
Figure 3E:
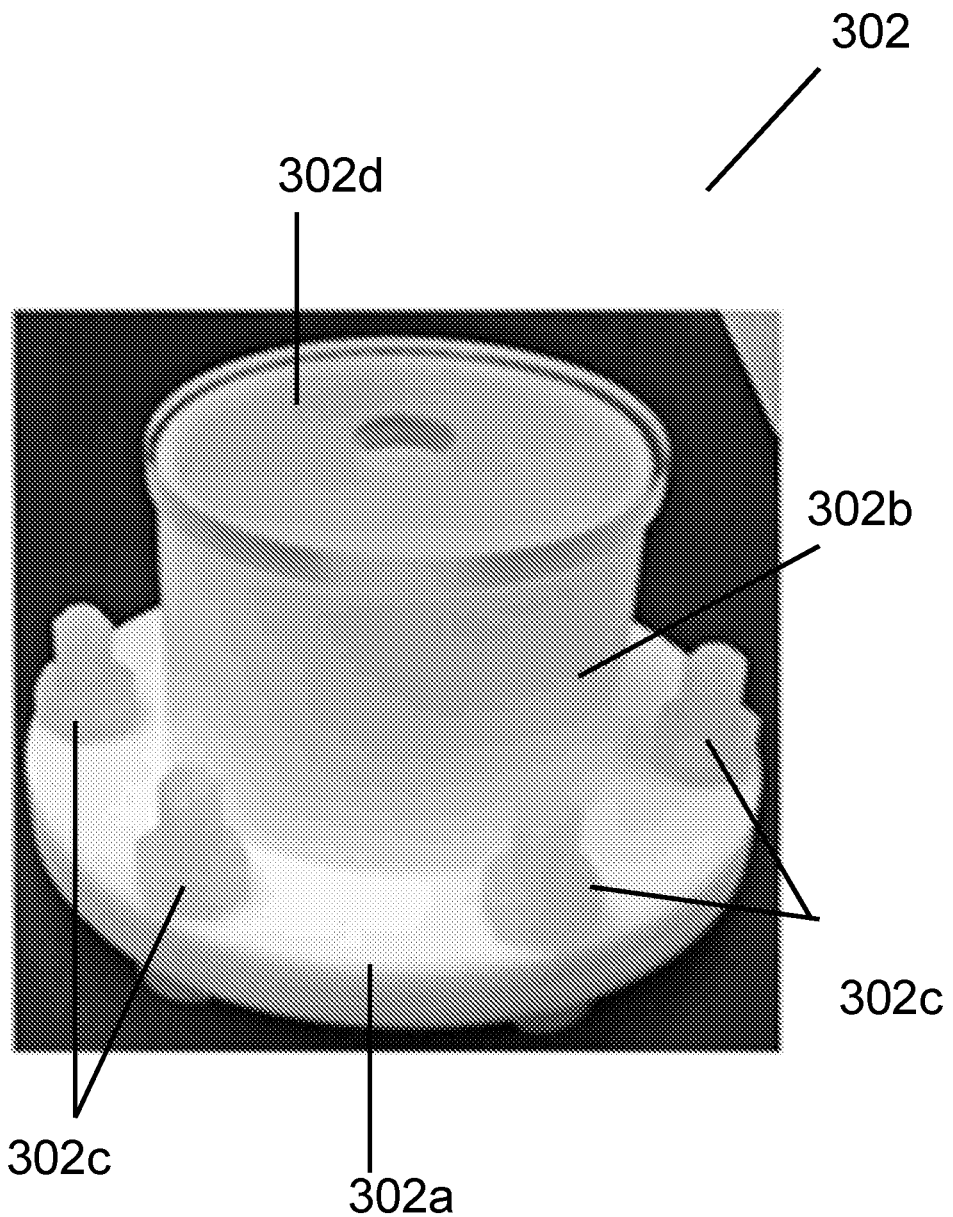
FIG. 3E shows a photo of the test cell or chamber according to various embodiments.

FIG. 3D is a schematic showing a cross-sectional side view of a test cell or chamber 302 containing a plurality of discs 312 according to various embodiments. For the sake of clarity, not all the discs 312 in FIG. 3D are labelled. FIG. 3E shows a photo of the test cell or chamber 302 according to various embodiments. The chamber 302 may include a base portion 302a and an upper portion 302b. The upper portion 302b may be fixed or secured to the base portion 302a using securing means 302c such as polyvinyl chloride (PVC) bolts and nuts. The chamber 302 may further include an acrylic lid 302d. The acrylic lid 302d may include an inlet hole extending from one side of the lid 302d to another side of the lid 302d.

The chamber 302 may include a layer of volatile liquid 304, which may be the same as the volatile liquid used to presaturate the plurality of tubular porous structures 306. The discs 312 may be arranged within the chamber 302 in a manner so that the plurality of tubular porous structures 306 is not in contact with the base portion 302a. As shown in FIG. 3D, a disc 312 may be arranged so that it leans on an inner wall of the chamber 302 or against another disc 312. A disc 312 may rest on the base portion 302a via an edge of the disc 312, i.e. via a portion of the plastic tube 314. In other words, the disc 312 may stand substantially vertical within the chamber 302. The discs 312 may also be arranged parallel to one another. The plurality of tubular porous structures 306 may also be not in contact with the rest of the chamber 302. The plurality of tubular porous structures 306 may be spaced apart from the chamber 302 by the plastic tube 314 and the glue 308. As the plurality of tubular porous structures 306 are not in contact with the base portion 302a, the plurality of tubular porous structures 306 may not be in contact with the layer of volatile liquid 304 (before the volatile liquid diffuses from layer 304 to the plurality of tubular porous structures 306). The volatile liquid may evaporate to form a vapour which may diffuse to the lumen and exposed inner surfaces of the plurality of tubular porous structures 306. The vapour may then saturate or condense into the pores of the inner surfaces. The condensed volatile liquid may then evaporate from the pores of the inner surface of the plurality of tubular porous structures 306.

The chamber 302 may also include a parafilm ring 316a and vacuum grease 316b to help seal the chamber 302. The vapour from the volatile liquid may only diffuse out of the chamber through the hole at the lid 302d, thereby controlling evaporation of the volatile liquid 304 in the chamber 302.

Figure 3F:
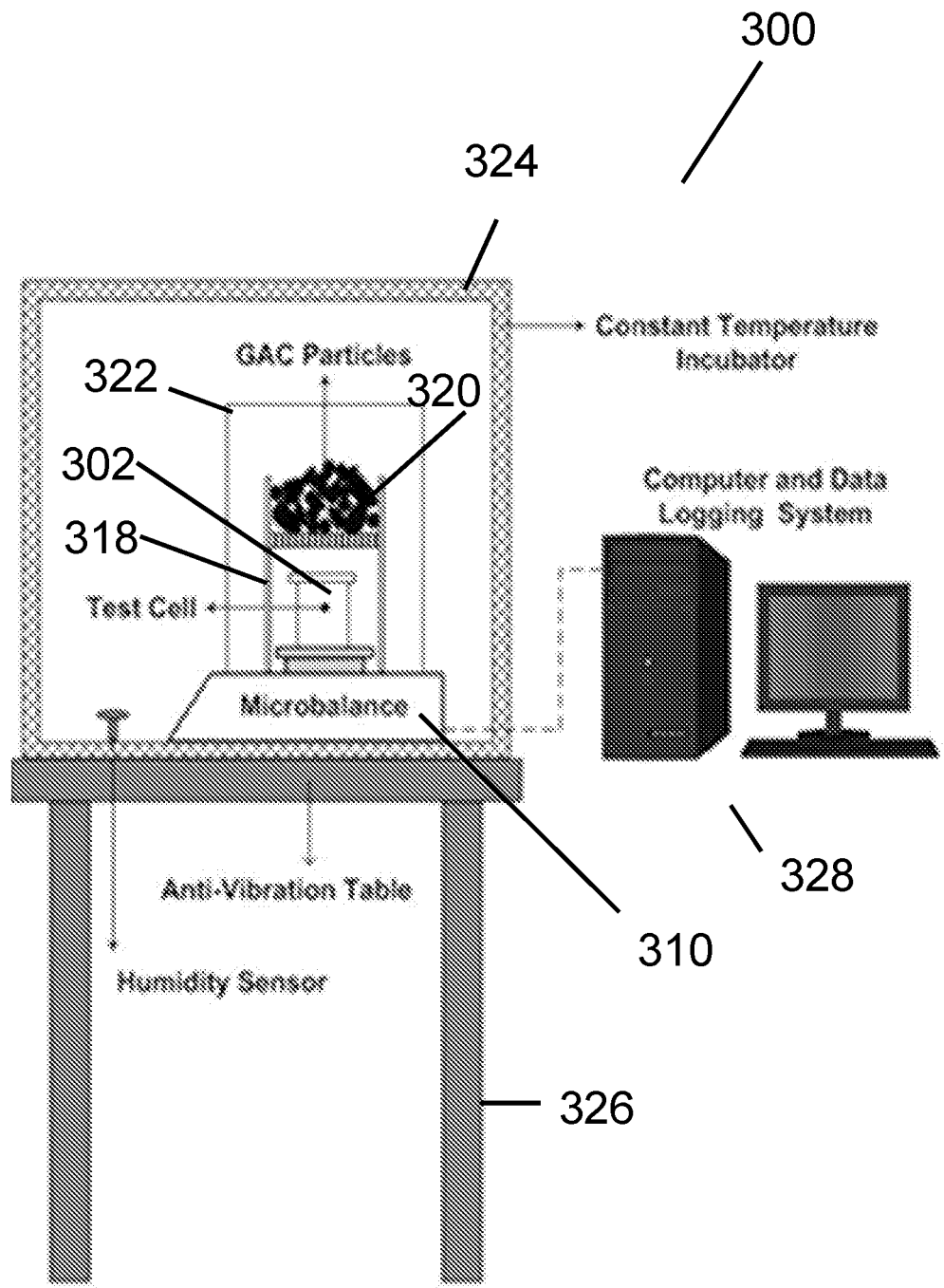
FIG. 3F is a schematic showing a cross-sectional side view of an arrangement including the test cell or chamber according to various embodiments.

FIG. 3F is a schematic showing a cross-sectional side view of an arrangement 300 including the test cell or chamber 302 according to various embodiments. The chamber 302 (with the discs 312 and the volatile liquid 304) may be placed on a mass determination device 310 such as a microbalance. The chamber 302 may be covered by a first covering structure 318. The first covering structure 318 and an absorbent 320, such as granular activated carbon (GAC) may be covered by a second covering structure 322. The first covering structure 318 may include one or more openings for the vapour to diffuse out. The diffused vapour may be absorbed by the absorbent 320. The mass determination device 310 may be configured to determine the change in mass of the chamber 302. The microbalance 310, the chamber 302, the first covering structure 318, the second covering structure 322, and the absorbent material 320 may be kept within an incubator 324 (or environmental chamber). The incubator 324 may be configured to maintain a temperature within the incubator 324 substantially constant.

The incubator 324 (containing the microbalance 310, the chamber 302, the first covering structure 318, the second covering structure 322, and the absorbent material 320) may be placed on an anti-vibration table 326. The microbalance 310 may be coupled to a computer system 328.

During operation, the mass determination device 310, the chamber or test cell 302, and the evaporating volatile liquid 304 may come to a steady-state temperature established by the environmental chamber or incubator. After the steady-state temperature is reached, the free-standing liquid evaporation period may commence during which the mass may decrease linearly as a function of time, thereby implying a constant evaporation rate. Once this free-standing liquid layer has evaporated, evaporation from the pores may begin (or in other words, the pore-draining period may begin). It may be assumed that evaporation from the membrane pores may not occur until the free-standing liquid 304 has evaporated due to the vapor-pressure depression by the pores.

Figure 4A:
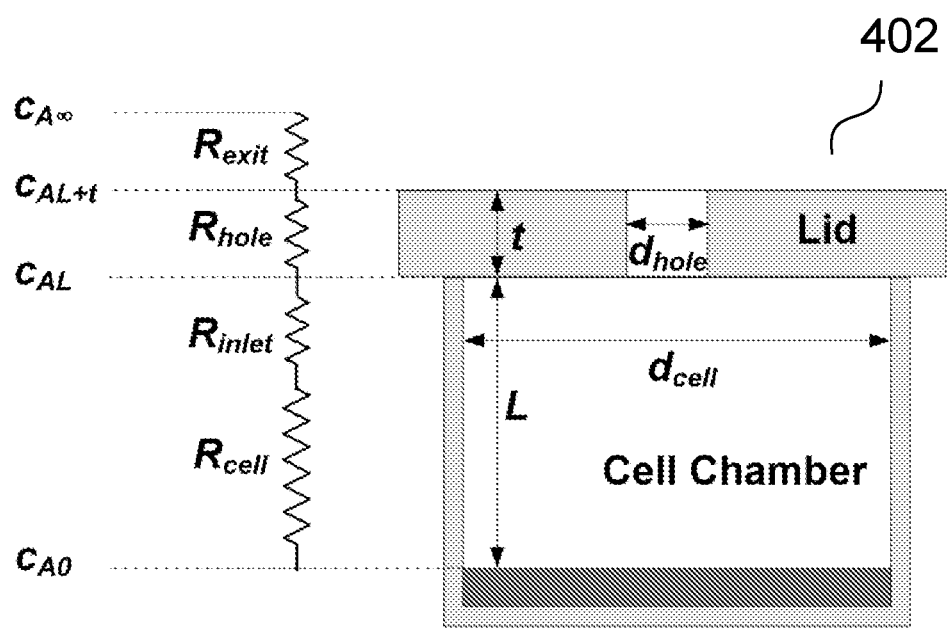
FIG. 4A is a schematic illustrating the different diffusion resistances of a test cell or chamber according to various embodiments.

The total diffusion resistance of the test cell $R_{total,cell}$ may include 4 diffusion resistances: (i) the diffusion resistance of the chamber $R_{cell}$, (ii) the diffusion resistance from the chamber to the hole inlet, $R_{inlet}$, (iii) the diffusion resistance through the cylindrical hole inlet present in the lid $R_{hole}$, and (iv) from the hole inlet to the semi-infinite space outside the test cell $R_{exit}$. FIG. 4A is a schematic illustrating the different diffusion resistances of a test cell or chamber 402 according to various embodiments.

The total diffusion resistance of a cell may be expressed by:

$$R_{total,cell} = R_{cell} + R_{inlet} + R_{hole} + R_{exit} \quad (4)$$

The diffusion resistance of the chamber $R_{cell}$ may be expressed as:

$$R_{cell} = \frac{4L_{cell}}{\pi D_{AB} d_{cell}^2} \quad (5)$$

where $L_{cell}$ is the height of the test cell/chamber, $D_{AB}$ is the diffusion coefficient of the vapour of the volatile liquid in the test cell/chamber, and $d_{cell}$ is the diameter of the test cell/chamber.

The diffusion resistance through the cylindrical hole inlet present in the lid $R_{hole}$ may be expressed as:

$$R_{hole} = \frac{4L_{hole}}{\pi D_{AB} d_{hole}^2} \quad (6)$$

wherein $L_{hole}$ is the length of the inlet hole and is equal to the thickness of the lid t, and $d_{hole}$ is the diameter of the inlet hole.

Equation (5) and Equation (6) are based on the assumption that owing to the very small evaporation rate the diffusion-induced bulk flow term in the species balance equations for the mass-transfer may be neglected compared to the molecular diffusion term. The resistances $R_{inlet}$ and $R_{exit}$ may be determined from the solution for heat transfer to or from a circular disc by invoking the analogy between heat and mass transfer. Hence, $$R_{inlet} = R_{exit} = \frac{1}{2D_{AB} d_{hole}} \quad (7)$$

Figure 4B:
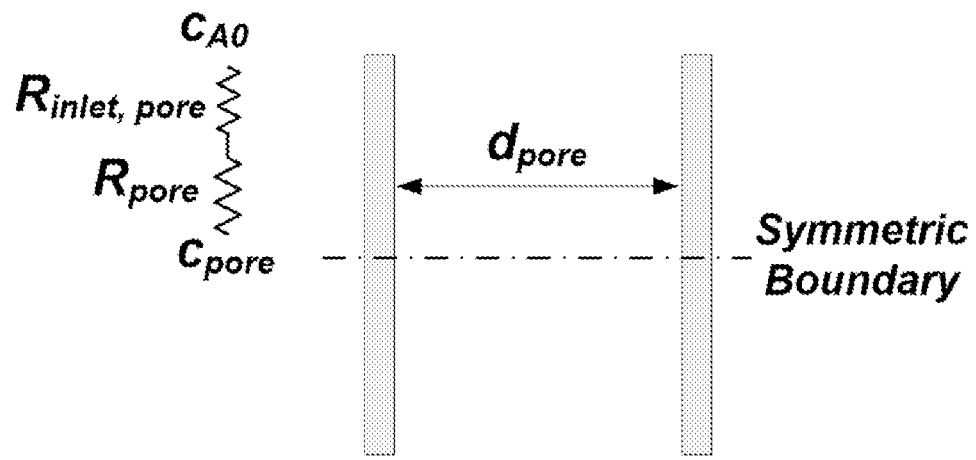
FIG. 4B is a schematic illustrating the different diffusion resistances of a pore according to various embodiments.
Figure 4C:
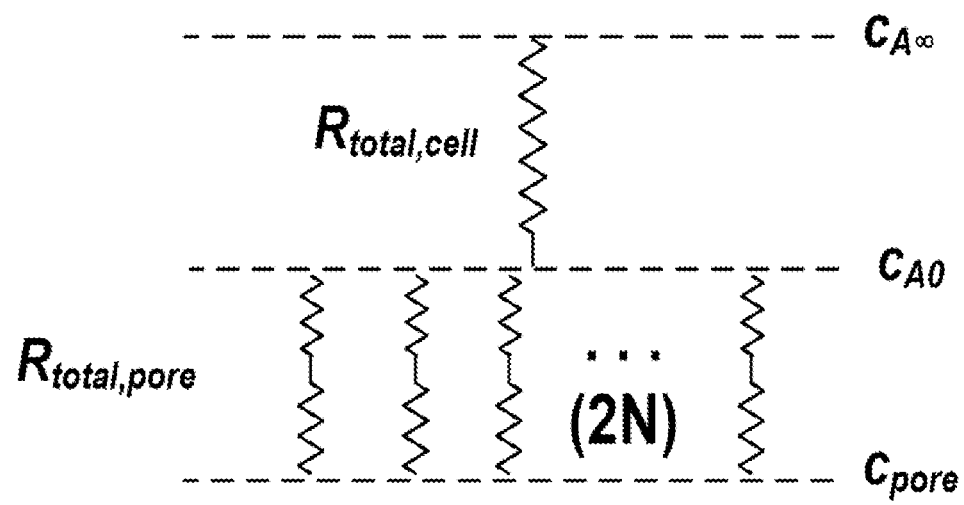
FIG. 4C is a schematic illustrating the total diffusion resistance of the pores $R_{total,\ pore}$ and the total diffusion resistance of a test cell $R_{total,\ cell}$ according to various embodiments.

FIG. 4B is a schematic illustrating the different diffusion resistances of a pore according to various embodiments. FIG. 4C is a schematic illustrating the total diffusion resistance of the pores $R_{total,pore}$ and the total diffusion resistance of a test cell $R_{total,cell}$ according to various embodiments. The total diffusion resistance of the pores $R_{total,pore}$ may be dependent on the diffusion resistance in each pore $R_{pore}$, and from the test cell space to each pore inlet $R_{inlet,pore}$. The total diffusion resistance of the pore $R_{total,pore}$ may be provided by:

$$R_{total,pore} = \frac{(R_{pore} * R_{inlet,pore})}{2N} \quad (8)$$

where N is the total number of porous tubular structures. $R_{pore}$ and $R_{inlet,pore}$ may take the same form of Equation (5) and Equation (7) respectively:

$$R_{pore} = \frac{4L_{pore}}{\pi D_{AB} d_{pore}^2} \quad (9)$$

$$R_{inlet,pore} = \frac{1}{2D_{AB} d_{pore}} \quad (10)$$

$R_{total,cell}$ may have to be significantly larger than $R_{total,pore}$ to allow for the characterization of the PSD of the selective layer on the lumen, i.e. the inner surface of the tubular porous structure. In other words, the following condition may need to be satisfied:

$$\frac{R_{total,pore}}{R_{total,cell}} \ll 1 \quad (11)$$

Substituting the various expressions for different diffusion resistances into Equation (11) provides:

$$\frac{\left(\frac{4L_{pore}}{\pi D_{AB} d_{pore}^2} + \frac{1}{2D_{AB} d_{pore}}\right)}{\left(\frac{4L_{cell}}{\pi D_{AB} d_{cell}^2} + \frac{4L_{hole}}{\pi D_{AB} d_{hole}^2} + \frac{2}{2D_{AB} d_{hole}}\right)} \ll 1 \quad (12)$$

As an example, if $L_{cell}$=25 mm, $d_{cell}$=35 mm, $L_{hole}$=2.7 mm, $d_{hole}$=10 mm, $L_{pore}$=1 mm, $d_{pore}$=0.72 mm, N=11 discs×21 fibers=231:

$$\frac{R_{total,pore}}{R_{total,cell}} = 0.043 \ll 1 \quad (13)$$

The total number of tubular porous structures in all the discs, N, may be increased to ensure that Equation (12) is satisfied. Various embodiments may provide a disc design with the concentration gradient inside the fiber being negligible so that the vapour concentration inside and outside of the fibers is almost the same. Pore-size-distribution characterization may be dependent on the discs being configured so that (i) there is a negligible concentration gradient along the axis of each tubular porous structure, and (ii) there is a uniform vapour concentration along the axis inside each tubular porous structure and laterally immediately above the tubular porous structures.

Figure 5A:
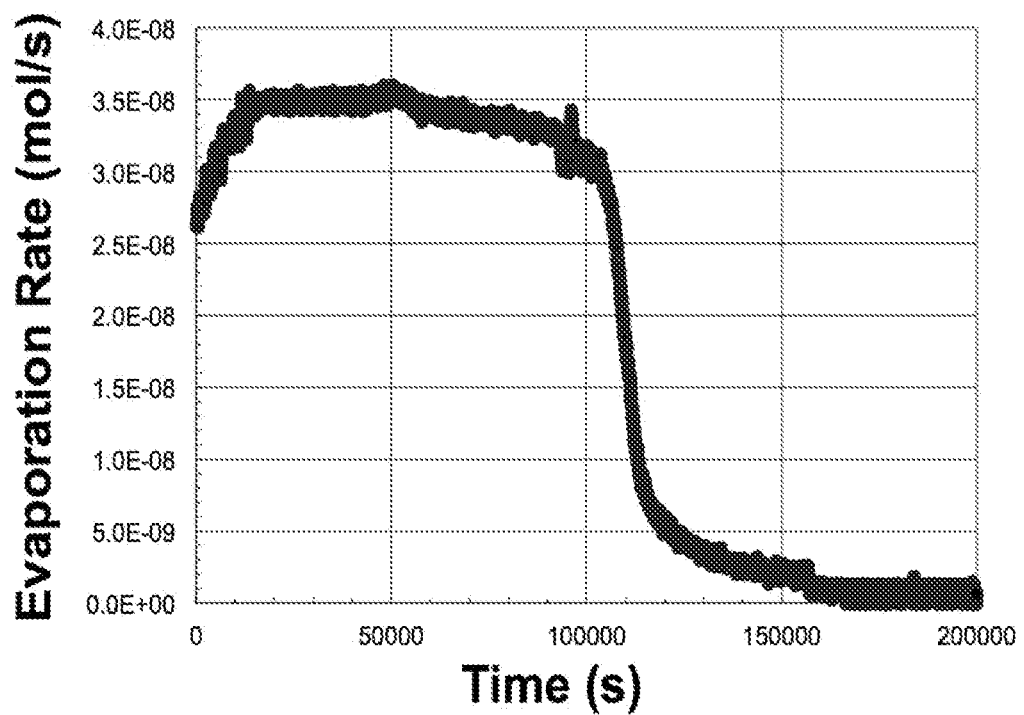
FIG. 5A is a plot of evaporation rate (moles per second or mol/s) as a function of time (seconds or s) showing the evaporation rate of a hollow fiber polymeric membrane using via an evapoporometry (EP)-based method according to one embodiment.
Figure 5B:
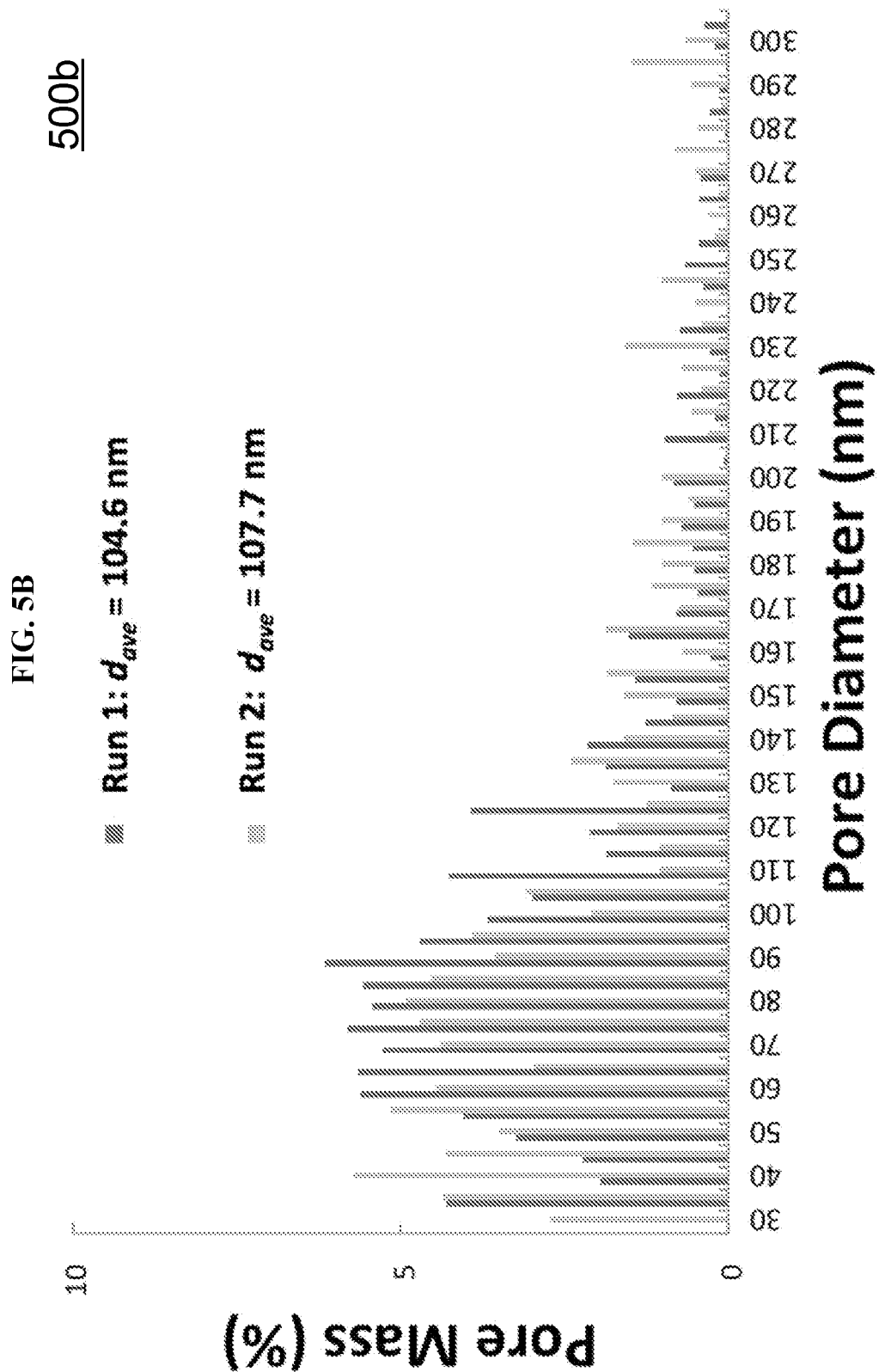
FIG. 5B is a plot of the pore mass (percentage or %) as a function of pore diameter (nanometers) showing the pore-size distribution (PSD) of the hollow fiber polymeric membrane obtained from two replicate runs via the evapoporometry (EP)-based method according to one embodiment.

FIG. 5A is a plot 500a of evaporation rate (moles per second or mol/s) as a function of time (seconds or s) showing the evaporation rate of a hollow fiber polymeric membrane using via an evapoporometry (EP)-based method according to one embodiment. FIG. 5B is a plot 500b of the pore mass (percentage or %) as a function of pore diameter (nanometers) showing the pore-size distribution (PSD) of the hollow fiber polymeric membrane obtained from two replicate runs via the evapoporometry (EP)-based method according to one embodiment. The hollow fiber polymeric membrane includes polyethersulfone (PES) and polyvinylpyrrolidone (PVP) with an internal diameter of 0.72 mm obtained from Norit Filtrix (Amsersfoort, The Netherlands). The pore size as measured via liquid-displacement porometry was reported as 140 nm. The evapoporometry (EP)-based method according to one embodiment provides an average pore size of about 106 nm, which is slightly smaller than the result obtained via porometry. The reason may be that the mass-average diameter determined by EP is based on $d^2$ (whereby d represents pore diameter), whereas the flow-average diameter determined by liquid displacement porometry (LDP) is based on $d^4$, and as a result, the latter is larger than the former.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for determining at least one pore-related parameter of a porous structure, the method comprising:
   supplying a volatile liquid into a chamber;
   coating a first surface of the porous structure with an evaporation preventing substance;
   placing the coated porous structure within the chamber;
   determining an effective mass of the chamber over a period of time; and
   determining the at least one pore-related parameter of an uncoated second surface of the coated porous structure based on the effective mass determined;
   wherein the second surface of the coated porous structure is opposite the first surface of the porous structure.

2. The method according to claim 1, wherein the porous structure is a tubular porous structure.

3. The method according to claim 1, wherein coating the first surface of the porous structure comprises embedding the porous structure in the evaporation preventing substance so that a substrate comprising the evaporation preventing substance and the porous structure embedded in the evaporation preventing substance is formed.

4. The method according to claim 1, further comprising:
   determining an evaporation rate from the effective mass determined; and
   relating the evaporation rate to a vapour pressure of the volatile liquid at an interface between the volatile liquid in the porous structure and an ambient gas phase within the chamber;
   wherein determining the at least one pore-related parameter of the porous structure comprises determining the at least one pore-related parameter based on the vapour pressure determined.

5. The method according to claim 1, further comprising:
   determining an evaporation rate from the effective mass determined; and
   relating the evaporation rate to a mole fraction of the volatile liquid at an interface between the volatile liquid in the porous structure and an ambient gas phase within the chamber;
   wherein determining the at least one pore-related parameter of the porous structure comprises determining the at least one pore-related parameter based on the mole fraction determined.

6. The method according to claim 1, wherein determining an effective mass of the chamber comprises determining the effective mass of the chamber at a series of time intervals to generate a plurality of instantaneous masses.

7. The method according to claim 6, wherein the at least one pore-related parameter is a pore-size distribution; and wherein determining the at least one pore-related parameter of the second surface of the porous structure comprises:
   associating a respective instantaneous mass of the generated plurality of instantaneous masses to a respective pore diameter of the porous structure; and
   determining the pore-size distribution based on the plurality of instantaneous masses generated and the associated pore diameters.

8. The method according to claim 1, further comprising saturating the porous structure with the volatile liquid prior to placing the porous structure in the chamber.

9. The method according to claim 1, further comprising saturating the porous structure within the chamber with the volatile liquid.

10. The method according to claim 1, wherein the volatile liquid is supplied to a base of the chamber so that the chamber comprises a depth of volatile liquid; and wherein the coated porous structure is placed within the chamber such that the porous structure is over the depth of volatile liquid.

11. The method according to claim 1, further comprising controlling evaporation of the volatile liquid in the chamber.

12. An arrangement for determining at least one pore-related parameter of a porous structure, the arrangement comprising:
    a chamber containing a volatile liquid;
    a porous structure contained within the chamber, the porous structure comprising a first surface and a second surface opposite the first surface, wherein the first surface of the porous structure is coated with an evaporation preventing substance, and wherein the second surface of the porous structure is uncoated; and
    a mass determination device configured to determine an effective mass of the chamber over a period of time so that the at least one pore-related parameter of the second surface of the porous structure is determined based on the effective mass determined.

13. The arrangement according to claim 12, wherein the porous structure is a tubular porous structure.

14. The arrangement according to claim 13, wherein the first surface is an outer surface of the tubular porous structure; and wherein the second surface is an inner surface of the tubular porous structure.

15. The arrangement according to claim 14, wherein the chamber comprises a disc comprising a substrate, the substrate comprising:
    the evaporation preventing substance; and
    the tubular porous structure embedded in the evaporation preventing substance with the outer surface of the tubular porous structure in contact with the evaporation preventing substance and the inner surface of the tubular porous structure uncoated.

16. The arrangement according to claim 12, wherein the chamber comprises a diffusion resistance element.

17. The arrangement according to claim 12, further comprising an absorbent material configured to control a vapour concentration of the volatile liquid.

18. The arrangement according to claim 12, further comprising an environmental chamber or incubator configured to maintain a temperature of the chamber.

19. The arrangement according to claim 12, further comprising an anti-vibration platform configured to support the mass determination device.

20. The arrangement according to claim 12, wherein the first surface of the porous structure is entirely covered by the evaporation preventing substance.

21. The method according to claim 2, wherein the first surface is an outer surface of the tubular porous structure; and wherein the second surface is an inner surface of the tubular porous structure.

\* \* \* \* \*